United States Patent [19]

Berisch

[11] 4,274,518

[45] Jun. 23, 1981

[54] BRAKE FORCE REGULATOR FOR A MOTORCYCLE HYDRAULIC BRAKE SYSTEM

[75] Inventor: Volker Berisch, Hattersheim, Fed. Rep. of Germany

[73] Assignee: ITT Industries, Inc., New York, N.Y.

[21] Appl. No.: 77,418

[22] Filed: Sep. 20, 1979

[30] Foreign Application Priority Data

Nov. 2, 1978 [DE] Fed. Rep. of Germany ....... 2847562

[51] Int. Cl.³ .............................................. B60T 8/26
[52] U.S. Cl. ................................... 188/344; 303/6 C
[58] Field of Search ...................... 303/6 A, 6 C, 6 R; 188/349, 106 P, 106 F, 344, 345

[56] References Cited

U.S. PATENT DOCUMENTS 4,174,867  11/1979  Oberthür ............................ 303/6 C

FOREIGN PATENT DOCUMENTS 2458515  6/1976  Fed. Rep. of Germany .......... 303/6 C
2558825  7/1977  Fed. Rep. of Germany .......... 303/6 C

*Primary Examiner*—Douglas C. Butler
*Attorney, Agent, or Firm*—John T. O'Halloran; Alfred C. Hill

[57] ABSTRACT

In a known motorcycle brake system, the pedal master cylinder acts on the front-wheel brakes, and the hand master cylinder acts only on the front-wheel brake. The brake force regulator's control behavior is influenced by the hand master cylinder. Known regulators have operational disadvantages and require a relatively high hand master cylinder pressure for shifting the stepped piston back to its rest position. Also, this pressure must be transmitted by the valve seat. These disadvantages are eliminated by the brake force regulator of the present invention which includes a pressure piston actuated by the pressure of the hand master cylinder and is in permanent interaction with the end surface of the smaller step of the stepped piston.

9 Claims, 3 Drawing Figures

BRAKE FORCE REGULATOR FOR A MOTORCYCLE HYDRAULIC BRAKE SYSTEM

BACKGROUND OF THE INVENTION

This invention relates to a brake force regulator for a motorcycle hydraulic brake system in which a rear-wheel brake and a front-wheel brake are actuated by the pressure from a pedal master cylinder and a further front-wheel brake is actuated by the pressure from a hand master cylinder, and in which the pressure supplied to the rear-wheel brake can be reduced by the brake force regulator dependent on the pressure generated by the hand master cylinder, with the brake force regulator having a stepped piston which is slidable against the force of a control spring and whose larger effective area is adapted to be exposed to the pressure from the pedal master cylinder and whose smaller effective area is adapted to be exposed to the pressure in the rear-wheel brake, and the stepped piston includes a valve which is adapted to be closed upon displacement of the stepped piston against the force of the control spring to interrupt the fluid connection from the pedal master cylinder to the rear-wheel brake.

From German Patent DE-OS No. 2,558,825 a brake force regulator is known which resembles conventional brake force regulators for passenger cars. In this brake force regulator, actuation of the pedal master cylinder initially results in unreduced pressure supply to a front-wheel brake and reduced pressure supply to the rear-wheel brake. If in addition the hand master cylinder is actuated, the pressure thereby generated counteracts the control force of the brake force regulator so that it reduces the pressure of the rear-wheel brake to a greater extent than if only the pedal master cylinder were actuated. In this arrangement, the brake force regulator is so designed that the displacement travel of its stepped piston is sufficient to reduce the pressure in the rear-wheel brake by means of an increase in the pressure of a front-wheel brake.

This prior known brake force regulator has the functional disadvantage that its stepped piston can be displaced also when pressure is built up by the hand master cylinder only, i.e., when only the hand brake, which acts on the front wheel is applied. The displacement of the stepped piston causes pressurized fluid to be drawn from the rear-wheel brake. As a result, a vacuum will be produced in the rear-wheel brake which may draw in air and contaminants that might result in a failure of the brakes.

The subject matter disclosed in the copending U.S. Patent application of H. Oberthuer, Ser. No. 928,927, filed July 28, 1978, now U.S. Pat. No. 4,174,867, issued Nov. 20, 1979, having the same assigned as the present application eliminates this disadvantage. Therein, the pressure generated by the hand master cylinder acts on a piston which also functions as a valve-closure member. Upon actuation of the hand master cylinder, this piston is loaded in the valve-closing direction and the valve seat is subjected to high mechanical loads because it is via the valve-closure member and the valve seat that the entire force necessary for displacement of the stepped piston against the pressure prevailing in the front-wheel brake actuated by the pedal master cylinder is to be transmitted to the stepped piston. In addition, it is not possible in the subject matter of the above-cited copending application to make the cross section of the piston actuated by the hand master cylinder of any size desired. Therefore, for shifting back of the stepped piston a high pressure is necessary which acts at the same time on the second front-wheel brake.

SUMMARY OF THE INVENTION

It is an object of the present invention to provide a brake force regulator of the type referred to hereinabove in which the pressure of the hand master cylinder required for shifting the stepped piston back is low and in which the force need not be transferred via the valve seat.

It is another object of the present invention to provide a brake force regulator of the type referred to hereinabove which is an improvement on the brake force regulator of the above-cited copending application and yet retains all of the advantages thereof.

A feature of the present invention is the provision of a brake force regulator for a motorcycle hydraulic brake system having a rear-wheel brake and a first front-wheel brake actuated by pressure from a pedal master cylinder, and a second front-wheel brake actuated by pressure from a hand master cylinder, the brake force regulator reducing the pressure supplied to the rear-wheel brake dependent on the pressure produced by the hand master cylinder, the brake force regulator comprising:

a stepped piston disposed in a housing slidable against the force of a control spring, a first effective area of the stepped piston being exposed to the pressure from the pedal master cylinder and a second effective area of the stepped piston smaller than the first effective area being exposed to the pressure in the rear-wheel brake;

a valve disposed in the stepped piston which is closed upon displacement of the stepped piston against the force of the control spring to interrupt a fluid connection in the stepped piston from the pedal master cylinder to the rear-wheel brake; and a pressure piston disposed in the housing in permanent interaction with the end surface of the smaller step of the stepped piston actuated by the pressure from the hand master cylinder, the dimension of the sealed cross section of the pressure piston being greater than the dimension of the sealed cross section of the smaller step of the stepped piston.

The essential advantages of the brake force regulator of this invention are that the valve is completely relieved of the load required for shifting the stepped piston back and that the low master-cylinder pressure permits more sensitive braking.

In a preferred embodiment of the subject matter of this invention, the stepped piston and the pressure piston are joined to form a common member. This enables the control spring to be arranged in the fluid outlet chamber. In order to avoid unintentional opening of the valve in the presence of a high differential of pressure between the fluid inlet and outlet chambers, it will be an advantage to provide a pin which acts on the valve-closure member and is subjected to the pressure of the hand master cylinder. In an advantageous improvement of the subject matter of this invention, the smaller step of the stepped piston is guided in a sleeve secured to the housing. This permits machining of the stepped bore in the housing from one side. The valve-closure member suitably has a tappet bearing against a plate resiliently supported in the valve-closing direction and held by a stop in the valve-opening direction. In this manner, the valve can also be kept closed if the stepped piston is in its end position adjacent to the fluid inlet chamber.

DESCRIPTION OF THE PREFERRED EMBODIMENT

Figure 1:
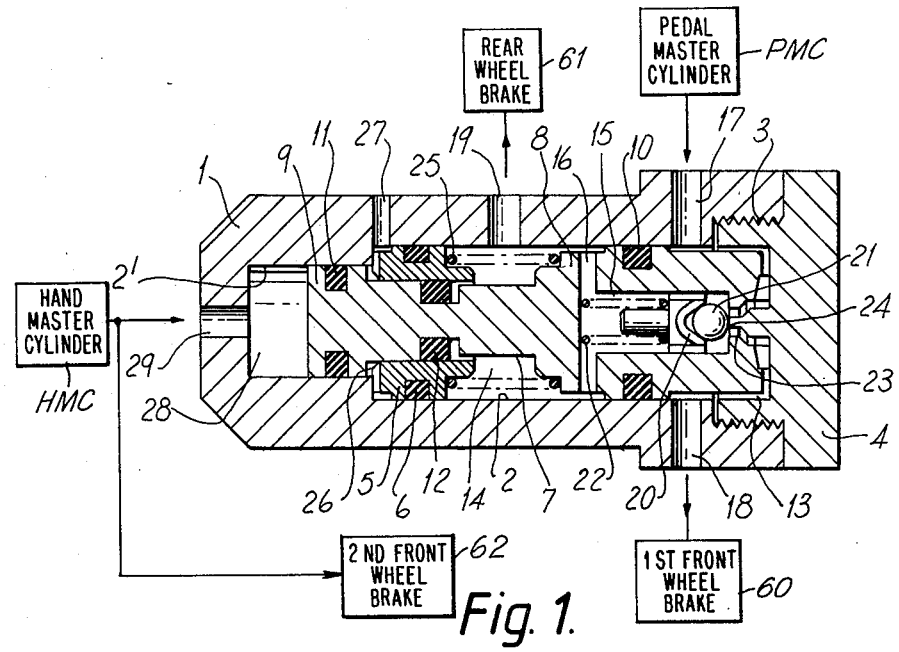
FIG. 1 is a longitudinal cross sectional view of a brake force regulator in accordance with the principles of the present invention including an integrally formed control piston.

Referring to FIG. 1, a housing 1 comprises a stepped blind-end bore 2, 2' including at its open end a thread 3 and closed by means of a screw 4. Arranged in bore section 2 adjacent to bore section 2' is a sleeve 5 which is sealed relative to housing 1 by means of a seal 6. A control piston 7, which includes a stepped piston portion 8 and a pressure piston portion 9, is housed in housing 1, with the larger step of stepped piston portion 8 being arranged in bore section 2, the smaller step in sleeve 5, and pressure piston portion 9, in bore section 2'. Control piston 7 is sealed relative to housing 1 by means of two seals 10 and 11, and relative to sleeve 5 by means of a seal 12.

The end surface of the larger piston step of stepped piston portion 8 forms a boundary for a fluid inlet chamber 13, and an annular surface of stepped piston portion 8 forms a boundary for a fluid outlet chamber 14. An axial fluid passageway 15 arranged in stepped piston portion 8 and a radial bore 16 connect chambers 13 and 14. Provided in housing 1 are two fluid ports 17 and 18 opening into fluid inlet chamber 13, and a fluid port 19 opening into fluid outlet chamber 14, with fluid port 17 being connected to a pedal master cylinder PMC, fluid port 18 being connected to a brake caliper of a first front-wheel brake 60, and fluid port 19 being connected to a brake caliper of a rear-wheel brake 61.

Arranged in axial fluid passageway 15 of stepped piston portion 8 is a valve-closure member 20 including a ball 21 which is urged into engagement with a valve seat 23 by a spring 22. Provided at the inner end surface of screw 4 is a pin 24 which extends into fluid passageway 15, and, in the end position of stepped piston portion 8 adjacent inlet chamber 13, unseats ball 21 from valve seat 23.

Fluid outlet chamber 14 accommodates between sleeve 5 and the larger step of stepped piston portion 8 a control spring 25 loading control piston portion 7 in the direction of screw 4 (to the right in the drawing). Formed between sleeve 5 and pressure piston portion 9 is a hollow space 26 which connects with atmosphere through an opening 27 in housing 1. The end surface of pressure piston portion 9 forms a boundary for a pressure chamber 28 into which a fluid port 29 connected to hand master cylinder HMC terminates. Hand master cylinder HMC also directly actuates a brake caliper of a second front wheel brake 62.

Figure 2:
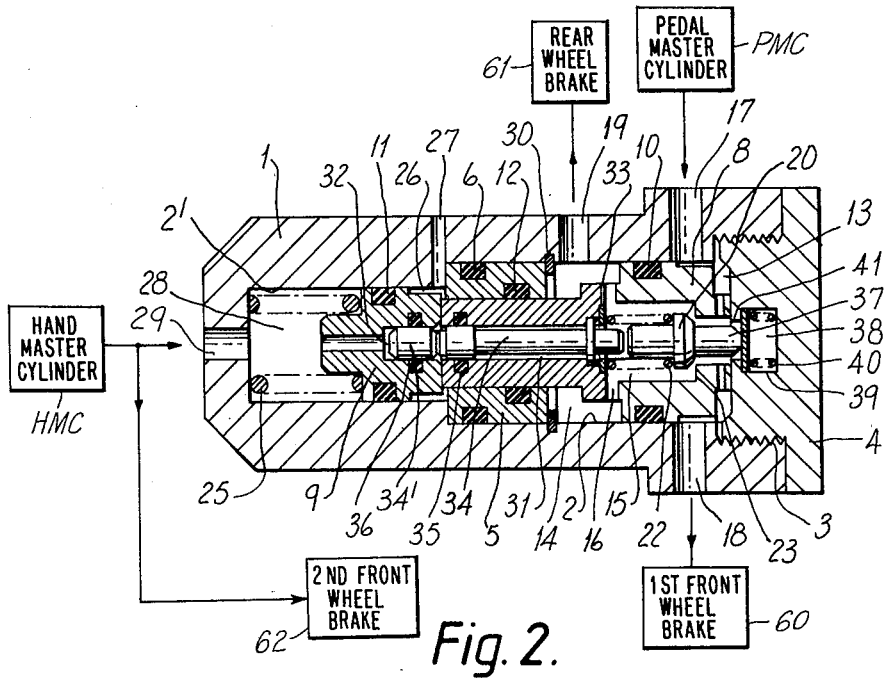
FIG. 2 is a longitudinal cross sectional view of brake force regulator in accordance with the principles of the present invention including a divided control piston.

FIG. 2 shows a brake force regulator corresponding essentially to the one shown in FIG. 1. Like parts have been assigned like reference numerals. To avoid repetitions, only the features distinguishing from those of FIG. 1 shall be dealt with in the following.

Stepped piston portion 8 and pressure piston portion 9 are two separate parts which are in interaction at one adjacent end surface thereof. Control spring 25 is arranged in pressure chamber 28 and directly loads pressure piston portion 9 and indirectly loads stepped piston portion 8 in the direction of screw 4. Since control spring 25 does not bear on sleeve 5 as in FIG. 1, a ring 30 is provided secured in housing 1 to prevent displacement of sleeve 5. Valve-closure member 20 includes a tappet 37 extending out of stepped piston portion 8 and bearing against a plate 39 arranged in a space 38 of screw 4. A spring 40 loads plate 39 in the direction of valve-closure member 20 against a stop 41. The force of spring 40 is greater than the force of spring 22 in order for the valve to be maintained open in the unpressurized state of the brake force regulator.

Provided in stepped piston portion 8 is a coaxial bore 31 and in pressure piston portion 9 a coaxial bore 32. A ring 33 against which spring 22 bears is arranged at the end of bore 31 close to the valve. Coaxial bores 31 and 32 house a pin 34 which is subjected to the controlled pressure of the first brake circuit on its one end and to the pressure of the second brake circuit on its other end. The end member 34' on the side close to pressure piston portion 9 is separated from pin 34. Pin 34 is sealed relative to stepped piston portion 8 by means of a seal 35, and end member 34' is sealed relative to pressure piston portion 9 by means of a seal 36.

Figure 3:
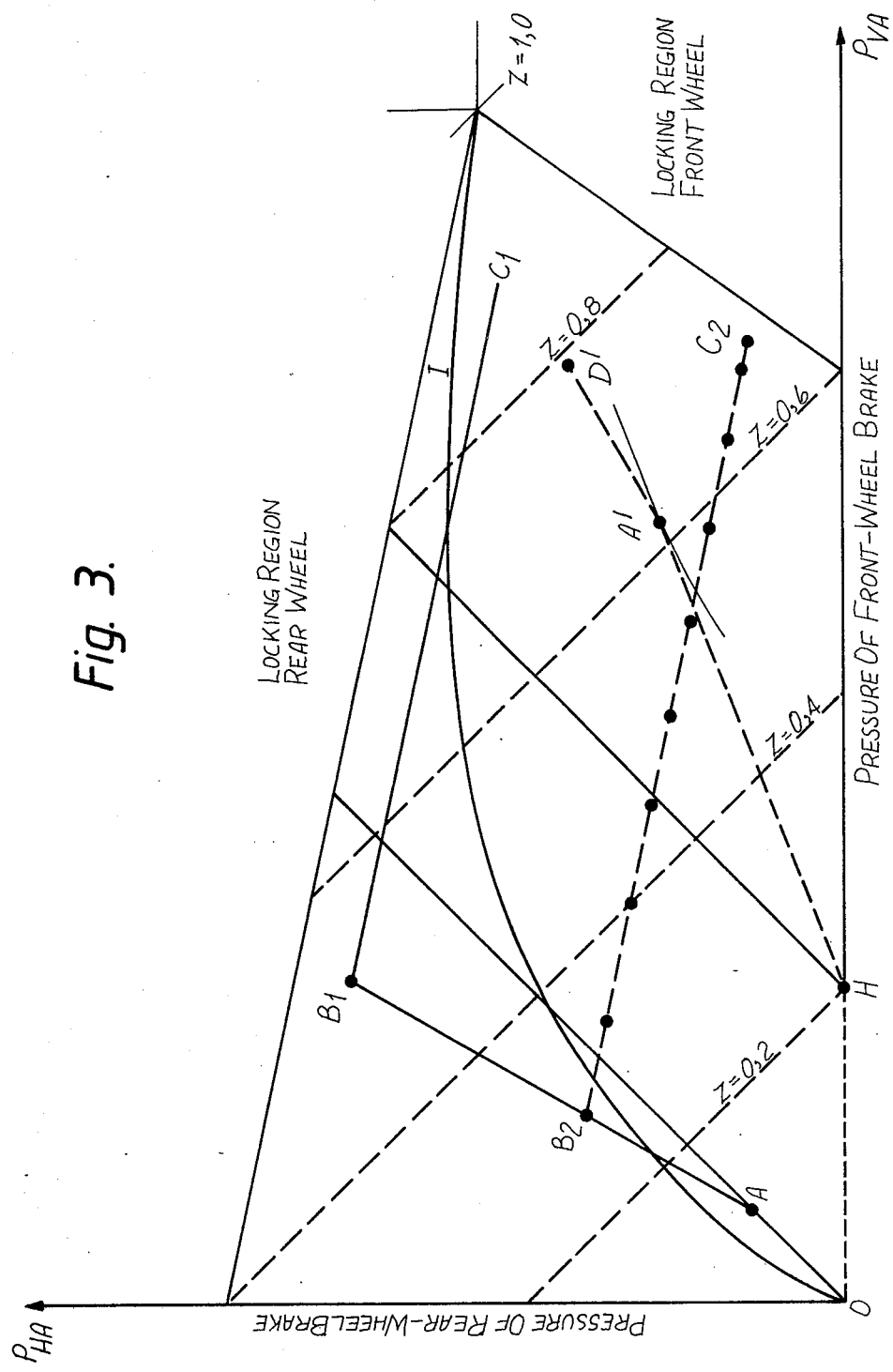
FIG. 3 is a chart showing brake pressure distribution curves useful in explaining the operation of the brake force regulator of the present invention.

FIG. 3 shows a chart of brake pressure distribution curves with the brake pressure of the rear wheel being plotted against the brake pressure of the front wheel. Curve I reflects the ideal brake pressure distribution under a specific load condition of a motorcycle. "z" indicates the deceleration for each curve. The course of the brake pressure distribution curves (points $O, A, B_1, C_1$ and $O, A, B_2, C_2$ and $O, H, A', D'$ respectively) will be explained in greater detail in connection with the description of the operation of the brake force regulator of the present invention.

The mode of operation of the brake force regulators illustrated in FIGS. 1 and 2 depends on the sequence of operation of the master cylinders and at which moment of the braking action the respective master cylinder is actuated. These variation possibilities result in a wide spectrum of brake pressure distribution characteristics of which only three examples will be described. The brake pressure distribution curves correspond in principle to the brake force regulators illustrated in FIGS. 1 and 2, they are, however, not accurate with respect to the surface ratios indicated. This is not necessary because the area ratios can be chosen freely.

The mode of operation of the brake force regulator illustrated in FIG. 1 shall be first described for the case where initially the pedal master cylinder alone is actuated, later followed by actuation of the hand master cylinder. At the beginning of the braking action, the brake force regulator is in the inactivated position shown. On actuation of pedal master cylinder PMC, a pressure is developed in fluid inlet chamber 13 which propagates to front-wheel brake 60, on the one hand, and through the open fluid passageway 15 into fluid outlet chamber 14 and onwards to rear-wheel brake 61, on the other hand. Because of the different areas subjected to pressure, a differential of force will act on stepped piston portion 8 moving control piston 7 to the left in the drawing against control spring 25. Control piston 7 will be shifted until the closure travel of the valve is overcome and ball 21 closes fluid passageway 15 by moving into engagement with valve seat 23. This is at point A of FIG. 3.

With the pressure in fluid inlet chamber 13 increasing by continued actuation of pedal master cylinder PMC, stepped piston portion 8 will be further shifted to the left in the drawing against control spring 25. This results in the generation of a pressure in fluid outlet chamber 14 which is increased as compared to the pressure prevailing in fluid inlet chamber 13, i.e., the brake pressure prevailing in rear-wheel brake 61 is higher than in front-wheel brake 60. As a result of the dynamic axle-load shift during the braking action, the rear wheel is relieved of the load as a consequence of which it tends to lock. In order to avoid a locked condition of the rear wheel, hand master cylinder HMC is actuated additionally. The commencement of hand master cylinder actuation is identified by point $B_1$ in FIG. 3.

Hand master cylinder HMC causes a pressure to be developed in pressure chamber 28 which acts on pressure piston portion 9 and thereby displaces stepped piston portion 8 in the direction of screw 4. The pressure generated by hand master cylinder HMC acts on front-wheel brake 62. As a result of the displacement of stepped piston 8, the volume of fluid inlet chamber 13 is reduced provided that the pedal master cylinder is kept in its position. Then there occurs an additional increase in pressure in front-wheel brake 60 caused by the volume reduction of chamber 13, and a pressure reduction occurs in rear-wheel brake 61 caused by the volume increase in chamber 14. From this results the course of the characteristic from $B_1$ to $C_1$, of FIG. 3.

If the hand master cylinder is actuated earlier, for example, at point $B_2$ of FIG. 3, stepped piston portion 8 will be displaced in this manner hereinabove described, and the pressure in rear-wheel brake 61 is reduced while the pressure in front-wheel brake 60 is increased. Thus, the course of the characteristic is from $B_2$ to $C_2$ of FIG. 3. In the embodiment shown in FIG. 1, the valve is pushed open when point $C_2$ is attained. If it is desired to prevent opening of the valve, the solution shown in FIG. 2 may be used, for example. With the pressure high the valve is not opened, and with the pressure low the differential of pressure between rear wheel brake 61 and front wheel brake 60 is so insignificant that opening of the valve has no effect.

Now the case will be described in which first hand master cylinder HMC and then pedal master cylinder PMC are actuated. At the beginning of the braking action, the brake force regulator is in the inactivated position shown in FIGS. 1 and 2. Upon actuation of hand master cylinder HMC, a pressure is developed in pressure chamber 28 and in front-wheel brake 62. Therefore, the motorcycle is initially braked at its front wheel only. This is shown by the course of the dash line between points O and H of FIG. 3.

H is assumed to be the point at which the vehicle operator actuates the pedal master cylinder PMC while the hand master cylinder HMC is left in its present position. The pedal master cylinder HMC causes pressure to be developed in fluid inlet chamber 13 which propagates to front-wheel brake 60, on the one hand, and through the open fluid passageway 15 into fluid outlet chamber 14 and onwards to rear-wheel brake 61, on the other hand. Because of the different area subjected to pressure, a differential of force will act on stepped piston portion 8 to the left in the drawing moving stepped piston 8 against control spring 25 and against the force acting on pressure piston portion 9 from the hand-master-cylinder pressure. After stepped piston portion 8 has overcome the closure travel of valve 20, 23 fluid passageway 15 will be closed. The change-over point is identified by A' in FIG. 3. For this point to be attained, the pressure of rear-wheel brake 61 has to be higher than it is at point A, because upon later actuation of pedal master cylinder PMC pressure piston portion 9 has to be moved against the pressure in pressure chamber 28.

With the pressure in fluid inlet chamber 13 increasing by continued actuation of pedal master cylinder PMC, stepped piston portion 8 is further displaced to the left in drawing against control spring 25. This causes a pressure increase in fluid outlet chamber 14 as compared to the pressure prevailing in fluid inlet chamber 13. If, during actuation of pedal master cylinder PMC, hand master cylinder HMC is left in its position attained at point H, there results, after closing of the valve, a pressure buildup in the front- and rear-wheel brakes which corresponds to the course of the characteristic between points A' and D' of FIG. 3.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake force regulator for a motorcycle hydraulic brake system having a rear-wheel brake and a first front-wheel brake actuated by pressure from a pedal master cylinder, and a second front-wheel brake actuated by pressure from a hand master cylinder, said brake force regulator controlling the pressure supplied to said rear-wheel brake dependent on the pressure produced by said hand master cylinder during the time when said pedal master cylinder and said hand master cylinder are simultaneously actuated, said brake force regulator comprising:

a control piston including
      a stepped piston portion disposed in and coaxial of a longitudinal axis of a housing axially slidable against the force of a control spring, said stepped piston portion having a first effective area exposed to the pressure from said pedal master cylinder and a second effective area exposed to the pressure in said rear-wheel brake, and
      a pressure piston portion disposed in said housing coaxial of said axis in tandem relationship with said stepped piston portion, said pressure piston portion having one end surface thereof in permanent association with the end surface of the smaller step of said stepped piston portion and the other end surface receiving pressure supplied by said hand master cylinder; and
   a valve disposed in a bore of said stepped piston portion coaxial of said axis, said valve being closed upon displacement of said stepped piston portion and said pressure piston portion against the force of said control spring to interrupt a fluid connection through said bore from said pedal master cylinder to said rear-wheel brake.

2. A regulator according to claim 1, further including a pin disposed in said stepped piston portion having one end thereof subjected to pressure from said hand master cylinder and the other end thereof acting on a closure member of said valve.

3. A regulator according to claim 2, wherein said valve closure member includes
a tappet extending from a surface thereof remote from said pin bearing against a plate disposed in a space of an end wall of said housing adjacent said pedal master cylinder, said plate being resiliently supported in a valve-closing direction and being held by a stop in said end wall in a valve-opening direction.

4. A regulator according to claim 3, wherein the smaller step of said stepped piston portion is guided in a sleeve secured to the housing.

5. A regulator according to claim 4, wherein said control spring is disposed between an end wall of said housing adjacent said hand master cylinder and said pressure piston portion.

6. A regulator according to claim 1, wherein said control spring is disposed between an end wall of said housing adjacent said hand master cylinder and said pressure piston portion.

7. A regulator according to claim 1, wherein said stepped piston portion and said pressure piston portion are joined at adjacent ends thereof to form an integral member.

8. A regulator according to claim 7, wherein the smaller step of said stepped piston portion is guided in a sleeve secured to said housing.

9. A regulator according to claim 8, wherein said control spring is disposed between said sleeve and said larger step of the stepped piston portion.

* * * * *